Feb. 14, 1950     F. S. ARGUELLES     2,497,428
PRECISION BALANCE
Filed July 15, 1947
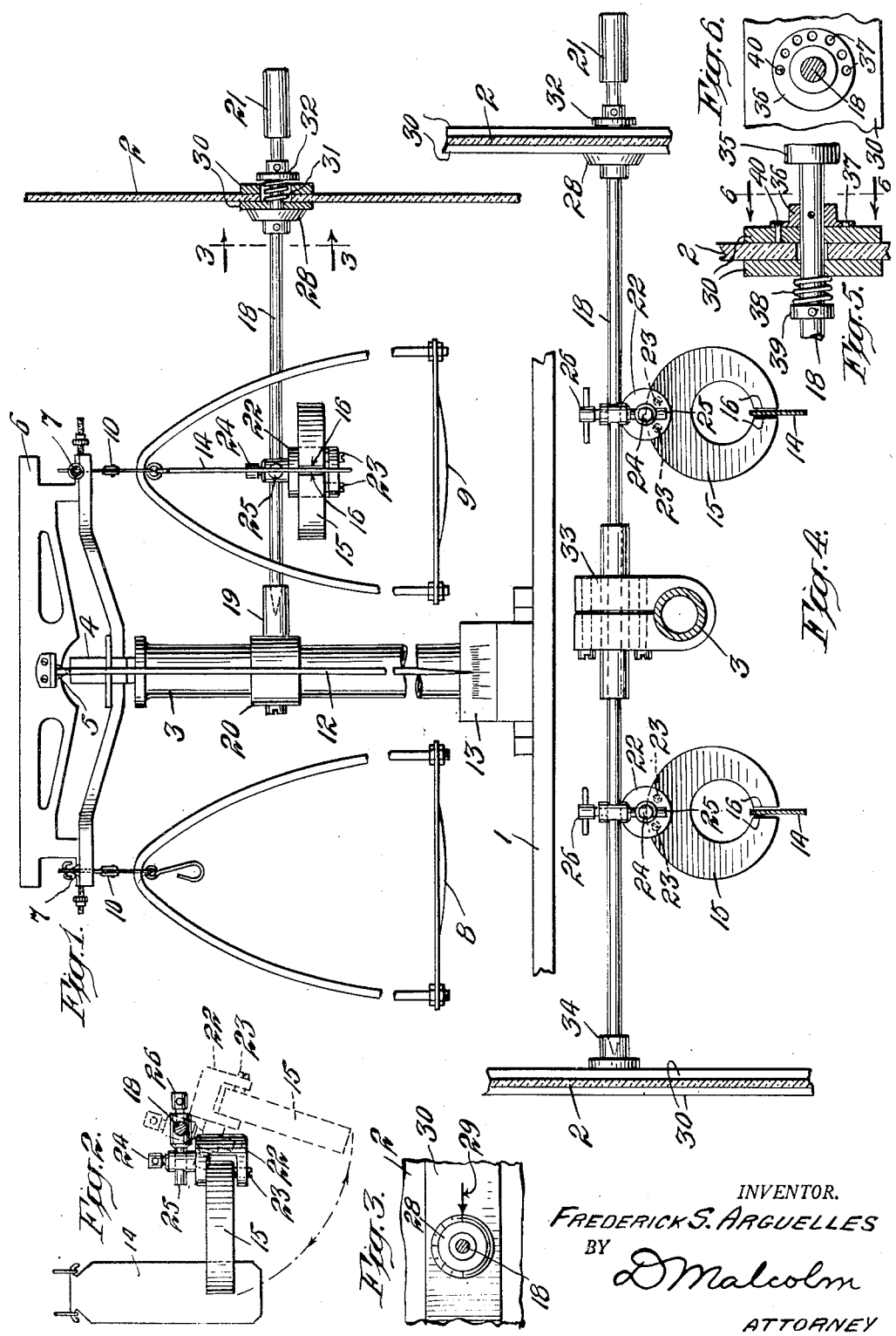
INVENTOR.
FREDERICK S. ARGUELLES
BY
D. Malcolm
ATTORNEY Patented Feb. 14, 1950

2,497,428

UNITED STATES PATENT OFFICE 2,497,428

PRECISION BALANCE

Frederick S. Arguelles, New York, N. Y., assignor to Seederer-Kohlbusch, Inc., Englewood, N. J., a corporation of New Jersey Application July 15, 1947, Serial No. 761,099

4 Claims. (Cl. 172—285)

This invention relates to magnetically damped precision balances and it has for its object to provide novel and improved means for controlling the damping effect in such balances.

Another object of the invention is to provide a simple and efficient adjustable magnet mounting for varying the damping effect in a balance of the above type from outside the casing of the balance.

Various other objects and advantages will be apparent as the nature of the invention is more fully disclosed.

This invention is applicable to magnetically damped precision balances of the type disclosed in Patent #1,900,641, issued March 7, 1933, to John Gattoni. Such a balance has a pivoted beam supporting the scale pans, a magnet mounted in the casing below the beam, and a non-magnetic damping plate pivotally suspended from the beam independently of the scale pans and arranged to move freely up and down between the poles of the magnet. The eddy currents set up by moving the plate through the magnetic field dampen the motion of the beam and bring the balance to rest in a few seconds whereas an undamped balance may take five minutes or longer to come to rest.

In the above balance the magnet may be adjusted with respect to the damping plate to vary the damping effect, this being desirable because the damping effect may vary under different load conditions and also because some operators prefer to let the balance swing for a longer or shorter time than others. In some early balances of the type referred to, adjustment of the magnet was effected manually as by means of screws or bolts whenever it was neccesary to change the setting.

As the above balance went into wide use in scientific laboratories, colleges, etc., where it was used for a wide variety of weighing operations, it became increasingly desirable to simplify and expedite the adjustment of the damping unit under all conditions of use, and this was accomplished satisfactorily by various rack-and-pinion mountings, spirally threaded tubes, etc. (as in Gattoni Patent #2,036,689, issued April 7, 1936) which moved the magnet toward or away from the damping plate whenever it was desired to vary the damping effect. The principal objection to such intricate adjustable mountings is their cost; and another objection is that they occupy considerable space inside the balance casing, not only because of their inherent bulk but also because they require considerable space in which to operate.

My invention overcomes the foregoing disadvantages by employing a compact ring-type magnet which occupies very little space in the balance casing and is adapted to be rotated through a relatively small arc about an axis which is diametrically opposite the poles of the magnet. The magnet is mounted on a rotatable control rod which extends through the casing, and, when the operator rotates this rod, the magnet is tipped or canted to straddle a greater or lesser area of the damping plate to provide any desired damping effect which is furthermore indicated at a glance by a dial on the control rod. This improved magnet mounting is so small and simple in construction that it constitutes only a tiny part of the overall bulk and weight of the balance, and it not only reduces the cost and size of the balance but also simplifies the adjustment of the magnet and expedites the weighing operation.

Although the novel features which are characteristic of this invention are set forth more in detail in the claims appended hereto, the nature and scope of the invention may be better understood by referring to the following description, taken in connection with the accompanying drawing forming a part thereof, in which certain specific embodiments have been set forth for purposes of illustration.

In the drawing:

Fig. 1 is a front elevation of a precision balance embodying the invention, with the major portion of the casing broken away to simplify the showing;

Fig. 2 is a side view of the non-magnetic damping plate and the cooperating circular magnet, the latter being shown both in full lines and in dotted lines to illustrate how the damping effect is varied;

Fig. 3 is a detail section on line 3—3 of Fig. 1, illustrating the dial for indicating the damping effect of the magnet;

Fig. 4 is a plan view, partly in section, illustrating a modification of the invention employing two damping plates and magnets;

Fig. 5 is a detail sectional view illustrating a modification of the control rod adjusting means; and Fig. 6 is a section taken on line 6—6 of Fig. 5.

In the following description certain specific terms are used for convenience in referring to the various details of the invention. These terms, however, are to be interpreted as broadly as the state of the art will permit.

The balance shown in Fig. 1 has a base 1 supporting a casing 2 which encloses the entire mechanism and is provided with transparent windows and sliding front in accordance with the usual practice in balances of this type.

The base 1 supports a standard 3 having a knife edge bearing 4 carrying the central knife edge 5 of the beam 6. The beam 6 carries knife edges 7 at its ends on which are hung the scale pans 8 and 9, the bows of said scale pans usually being hung on the upper hooks of double-hook yoke frames 10, as shown in Fig. 1. Also attached to the beam 6 is the usual pointer or indicator 12 cooperating with the graduated scale 13 on the base 1.

A flat vertical damping plate 14 of aluminum or other non-magnetic material is freely suspended on the lower hook of the yoke frame 10 at either one or both ends of the balance. The balance illustrated in Fig. 1 has only one damping plate 14 which, as will be noted, is suspended from the right-hand end of the beam 6. To counterbalance the weight of the damping plate 14 a small weight may be suspended from the opposite yoke frame.

Cooperating with the damping plate 14 is a substantially circular magnet 15 having closely spaced poles 16 providing a concentration of flux in the path of the damping plate 14 which is adapted to move up and down between said poles 16. The mounting of this magnet 15, and its adjustment to vary the damping effect, will now be described.

A rotatable horizontal control rod 18 in casing 2 has its inner end journaled in bearing 19 carried by collar 20 which is secured to standard 3, and its outer end extending through the side wall of casing 2 and terminating in a finger piece or handle 21 for rotating said control rod from outside the casing.

A bifurcated clamp 22 is secured by screws 23 to the magnet 15 diametrically opposite the magnet poles 16, and this clamp is adjustably secured by set screw 24 to a member 25 which, in turn, is adjustably secured to control rod 18 by set screw 26. By manually adjusting the various parts of this clamping device, and securing them in adjusted position by means of screws 23, 24 and 26, the magnet 15 may be initially set to permit the damping plate 14 to move freely up and down between the magnet poles 16 without striking said poles.

When it is desired to vary the damping effect either before or during a weighing operation, the operator simply grasps the finger piece 21 outside the casing 2 and rotates the control rod 18, thus rotating the magnet 15 in either a clockwise or counter-clockwise direction as viewed in Fig. 2, and thereby varying the damping effect from the maximum (full line position of the magnet in Fig. 2) to the minimum or "no damping" position of the magnet shown in broken lines in Fig. 2.

The damping effect of the magnet upon the damping plate 14 is indicated by a calibrated dial 28 which is keyed to control rod 18 and cooperates with an indicating pointer 29 marked on the face of one of the pair of bars 30 which brace the glass side wall of the balance. A coil spring 31 is compressed between this bar 30 and a nut 32 on rod 18, urging rod 18 toward the right as viewed in Fig. 1 and thereby causing dial 28 to frictionally engage the face of said bar 30 so as to hold the rod 18 in any position to which it may be adjusted.

The balance illustrated in Fig. 4 is the same as that previously described except that damping plates 14 are suspended from both ends of the beam 6, hence the control rod 18 carries two magnets 15, one for each damping plate. The construction and mounting of the parts is the same as described above, except that the central portion of the elongated control rod 18 is journaled in a bushing 33 carried by the standard 3, and the inner end of said control rod is journaled in a bearing 34 on left-hand end of casing 2.

Figs. 5 and 6 illustrate a modification in which the outer end of control rod 18 terminates in a knurled knob 35 and a disc 36 containing a circular series of holes 37 is keyed to said rod and is urged against the face of the outer bar 30 by a coil spring 38 compressed between the inner bar 30 and a nut 39 on rod 18. The various holes 37 in disc 36 are engageable with a pin 40 on the face of the outer bar 30, so that, by drawing the rod 18 outwardly against the force of spring 38 and then rotating it until a selected hole 37 engages the pin 40, the setting of the magnet or magnets 15 may be adjusted in predetermined gradations.

Although certain specific embodiments have been shown and described herein for purposes of illustration, it will be evident to those skilled in the art that the invention is capable of various modifications and adaptations within the scope of the appended claims.

The invention claimed is:

1. In a precision balance, a casing, a standard therein, a beam pivoted on said standard, a vertical damping plate of non-magnetic material freely suspended from said beam, a substantially circular magnet having closely spaced poles adapted to lie on opposite sides of said damping plate to dampen the motion of said beam, a horizontal control rod journaled in said casing with one end extending outside said casing and having means for rotating said rod from outside the casing, and means securing said magnet to said control rod diametrically opposite the magnet poles whereby to rotate said magnet with respect to said damping plate to vary the damping effect upon rotation of said control rod.

2. In a precision balance, a casing, a standard therein, a beam pivoted on said standard, a vertical damping plate of non-magnetic material freely suspended from said beam, a substantially circular magnet having closely spaced poles adapted to lie on opposite sides of said damping plate to dampen the motion of said beam, a horizontal control rod journaled in said casing with one end extending outside said casing and having a finger piece for rotating said rod from outside the casing, a clamp carried by said control rod and secured to said magnet diametrically opposite the magnet poles whereby to rotate said magnet with respect to said damping plate to vary the damping effect upon rotation of said control rod, and means for adjusting said magnet with respect to said clamp to align the magnet poles with said damping plate.

3. In a precision balance, a casing, a standard therein, a beam pivoted on said standard, a vertical damping plate of non-magnetic material freely suspended from said beam, a substantially circular magnet having closely spaced poles adapted to lie on opposite sides of said damping plate to dampen the motion of said beam, a horizontal control rod journaled in said casing with one end extending outside said casing and having a finger piece for rotating said rod from outside the casing, a clamp carried by said control rod and secured to said magnet diametrically opposite the magnet poles whereby to rotate said magnet with respect to said damping plate to vary the damping effect upon rotation of said control rod, means for adjusting said magnet with respect to said clamp to align the magnet poles with said damping plate, a dial carried by said rod within said casing to indicate the damping effect of said magnet upon said damping plate, and means for holding said control rod in adjusted position.

4. In a precision balance, a casing, a standard therein, a beam pivoted on said standard, a vertical damping plate of non-magnetic material freely suspended from said beam, a substantially circular magnet having closely spaced poles adapted to lie on opposite sides of said damping plate to dampen the motion of said beam, a horizontal control rod journaled in said casing with one end extending outside said casing and having a finger piece for rotating said rod from outside the casing, a clamp carried by said control rod and secured to said magnet diametrically opposite the magnet poles whereby to rotate said magnet with respect to said damping plate to vary the damping effect upon rotation of said control rod, means for adjusting said magnet with respect to said clamp to align the magnet poles with said damping plate, a dial carried by said rod within said casing to indicate the damping effect of said magnet upon said damping plate, and a spring urging said dial into frictional engagement with the interior of said casing to hold said control rod in any position to which it may be rotated.

FREDERICK S. ARGUELLES.

REFERENCES CITED

The following references are of record in the file of this patent:

UNITED STATES PATENTS

| Number | Name | Date |
|---|---|---|
| 1,900,641 | Gattoni | Mar. 7, 1933 |
| 2,036,689 | Gattoni | Apr. 7, 1936 |